(12) United States Patent
Baek et al.

(10) Patent No.: US 12,006,144 B2
(45) Date of Patent: Jun. 11, 2024

(54) APPARATUS FOR STORAGE OF CARRYING MATERIAL

(71) Applicant: Samsung Electronics Co., Ltd., Suwon-si (KR)

(72) Inventors: Gyeongdam Baek, Hwaseong-si (KR); Minsoo Park, Yongin-si (KR); Seungjun Lee, Hwaseong-si (KR); Mingu Chang, Seoul (KR); Byungkook Yoo, Hwaseong-si (KR); Hujong Lee, Suwon-si (KR); Jimin Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 329 days.

(21) Appl. No.: 17/517,963

(22) Filed: Nov. 3, 2021

(65) Prior Publication Data
US 2022/0144542 A1 May 12, 2022

(30) Foreign Application Priority Data
Nov. 10, 2020 (KR) .................. 10-2020-0149494

(51) Int. Cl.
*B65G 1/04* (2006.01)
*B65G 23/22* (2006.01)
*B65G 23/24* (2006.01)

(52) U.S. Cl.
CPC ........... *B65G 1/0457* (2013.01); *B65G 23/22* (2013.01); *B65G 23/24* (2013.01); *B65G 2201/0297* (2013.01); *B65G 2812/02148* (2013.01)

(58) Field of Classification Search
CPC ...................... B65G 1/0457; B65G 2201/0297
See application file for complete search history.

(56) References Cited

U.S. PATENT DOCUMENTS

| | | | |
|---|---|---|---|
| 7,578,650 B2 * | 8/2009 | Aalund | H01L 21/67775 414/217 |
| 7,695,234 B2 * | 4/2010 | Yamashita | H01L 21/67769 414/940 |

(Continued)

FOREIGN PATENT DOCUMENTS

| | | |
|---|---|---|
| JP | 2020-075819 A | 5/2020 |
| KR | 10-1123888 B1 | 3/2012 |

(Continued)

*Primary Examiner* — Jonathan Snelting
(74) *Attorney, Agent, or Firm* — Harness, Dickey & Pierce, P.L.C.

(57) ABSTRACT

An apparatus for storage of a carrying material, includes: a body frame; a plurality of loading members installed on the body frame and disposed such that a carrying material forms a plurality of layers in upper and lower directions; a driving unit connected to at least one of the plurality of loading members; and an auxiliary coupling unit provided in a portion of the plurality of loading members for attachment and detachment to and from a neighboring loading member, wherein the plurality of loading members are provided with a plurality of first loading members fixedly installed at a lower end portion of the body frame, and a plurality of second loading members disposed above the first loading member and movably installed on the body frame, wherein the driving unit is connected to at least one of the plurality of second loading members, wherein the auxiliary coupling unit includes an electromagnet installed at one end of the second loading members, and a magnetic body installed at the other end of the second loading members and the body frame to correspond to the electromagnet.

8 Claims, 7 Drawing Sheets

(56) References Cited

U.S. PATENT DOCUMENTS

| | | | |
|---|---|---|---|
| 8,070,410 B2 * | 12/2011 | Rebstock | H01L 21/67766 |
| | | | 414/217 |
| 8,196,732 B2 | 6/2012 | Fatula, Jr. et al. | |
| 8,219,233 B2 | 7/2012 | Tsukinoki | |
| 8,251,635 B2 | 8/2012 | Yamamoto | |
| 8,757,955 B2 | 6/2014 | Murata et al. | |
| 9,543,178 B2 * | 1/2017 | Lee | H01L 21/67772 |

FOREIGN PATENT DOCUMENTS

| | | | |
|---|---|---|---|
| KR | 10-1544699 B1 | 8/2015 | |
| KR | 10-1674454 B1 | 11/2016 | |

\* cited by examiner

APPARATUS FOR STORAGE OF CARRYING MATERIAL

CROSS-REFERENCE TO RELATED APPLICATION

This application claims the priority and benefit of Korean Patent Application No. 10-2020-0149494, filed on Nov. 10, 2020, with the Korean Intellectual Property Office, the inventive concept of which is incorporated herein by reference.

BACKGROUND

1. Field

The present inventive concept relates to an apparatus for storage of a carrying material.

2. Description of Related Art

A semiconductor manufacturing line is provided with an overhead hoist transport (OHT) for transporting a carrying material between process/storage facilities, and the overhead hoist transport (OHT) moves along a traveling rail.

The semiconductor manufacturing line is provided with an apparatus for storage of a carrying material installed on a side surface or a lower surface of the traveling rail to store the carrying the material.

However, due to diversification of processes, an amount of storage of a carrying material is increasing. However, when a structure of the apparatus for storage of a carrying material is changed to store more carrying materials, there is problem in that a size of the overhead hoist transport (OHT) is increasing or the number of components is increasing, so that a specification of a software for driving the overhead hoist transport (OHT) must be changed.

SUMMARY

An aspect of the present inventive concept is to provide an apparatus for storage of a carrying material facilitating transport and loading of a carrying material while increasing a loading space of the carrying material.

According to an aspect of the present inventive concept, an apparatus for storage of a carrying material includes: a body frame; a plurality of loading members installed on the body frame and disposed such that a carrying material forms a plurality of layers in upper and lower directions; a driving unit connected to at least one of the plurality of loading members; and an auxiliary coupling unit provided in a portion of the plurality of loading members for attachment and detachment to and from a neighboring loading member, wherein the plurality of loading members are provided with a plurality of first loading members fixedly installed at a lower end portion of the body frame, and a plurality of second loading members disposed above the first loading members and movably installed on the body frame, wherein the driving unit is connected to at least one of the plurality of second loading members, wherein the auxiliary coupling unit includes an electromagnet installed at one end of the second loading members, and a magnetic body installed at the other end of the second loading members and the body frame to correspond to the electromagnet.

BRIEF DESCRIPTION OF DRAWINGS

The above and other aspects, features, and advantages of the present inventive concept will be more clearly understood from the following detailed description taken in conjunction with the accompanying drawings, in which.

DETAILED DESCRIPTION

Hereinafter, preferred example embodiments of the present inventive concept will be described with reference to the accompanying drawings as follows.

Figure 1:
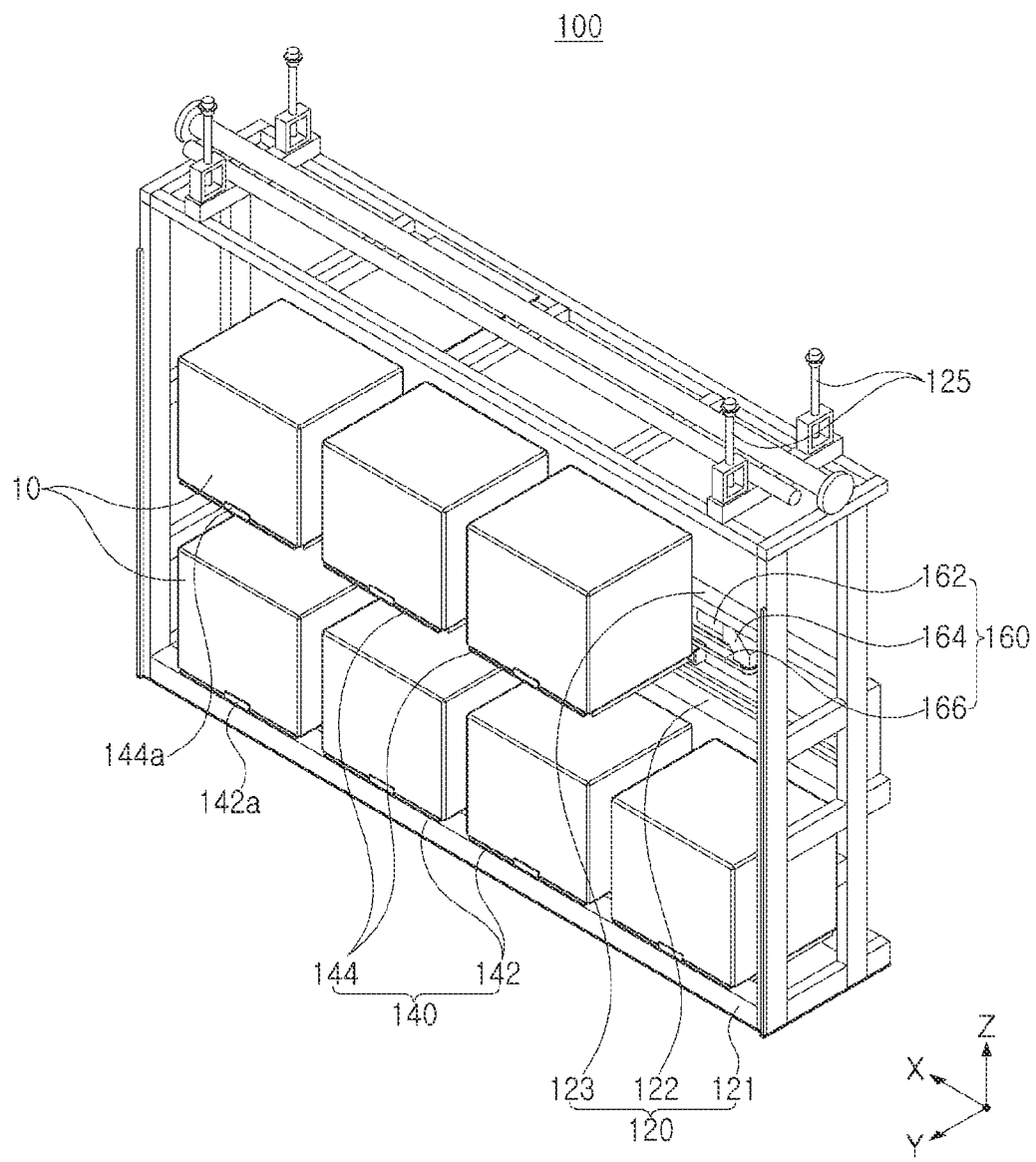
FIG. 1 is a front perspective view illustrating an apparatus for storage of a carrying material according to an example embodiment.
Figure 2:
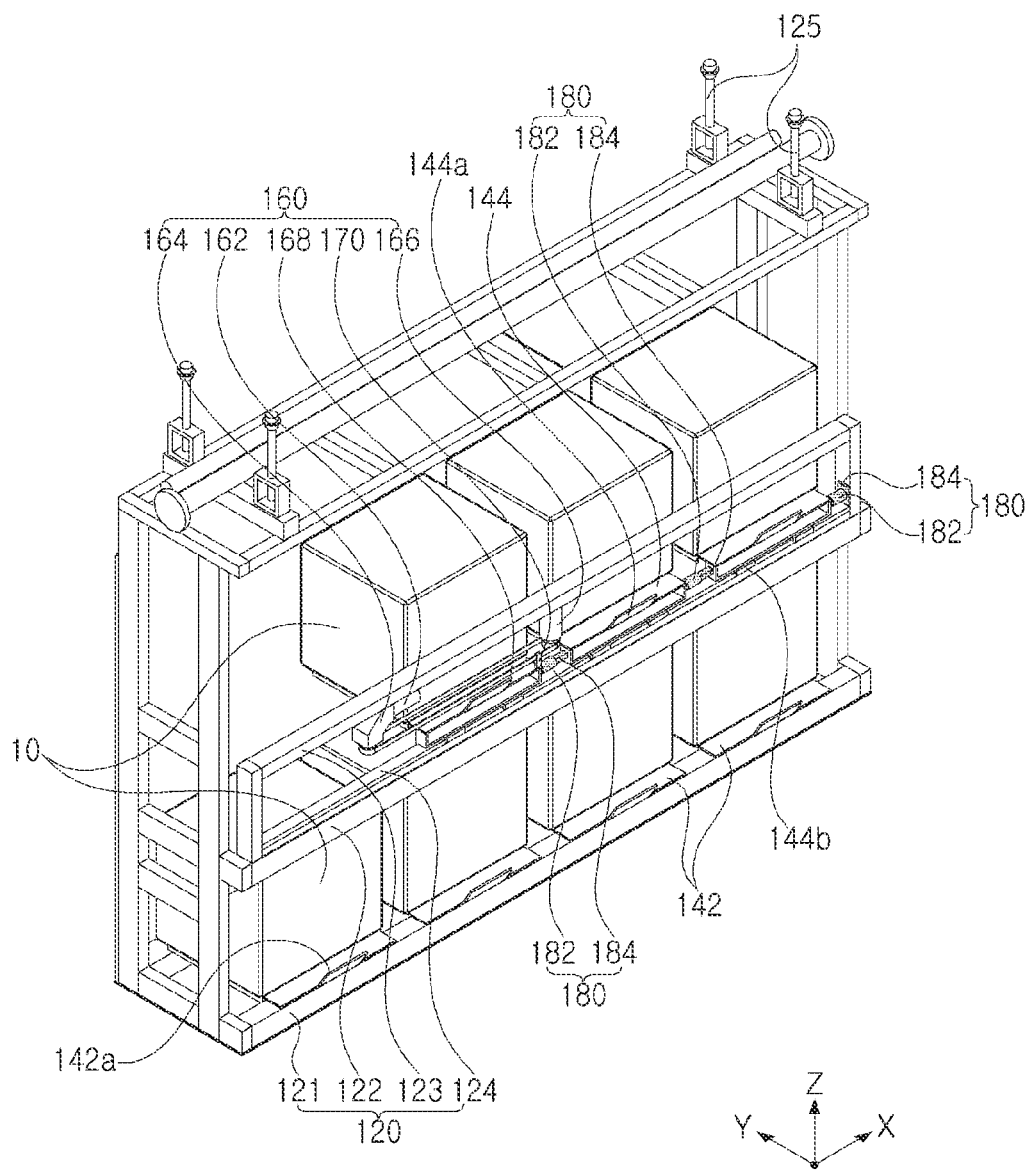
FIG. 2 is a rear perspective view illustrating an apparatus for storage of a carrying material according to an example embodiment.

FIG. 1 is a front perspective view illustrating an apparatus for storage of a carrying material according to an example embodiment, and FIG. 2 is a rear perspective view illustrating an apparatus for storage of a carrying material according to an example embodiment.

Referring to FIGS. 1 and 2, an apparatus for storage of a carrying material 100 may include a body frame 120, a loading member 140, a driving unit 160, and an auxiliary coupling unit 180.

The body frame 120 has a multi-stage structure so that a carrying material 10 is disposed to form a plurality of layers. As an example, the body frame 120 may include a first end portion 121 and a second end portion 122 spaced apart from the first end 121 toward the upper side. Meanwhile, the second end portion 122 may be provided with an installation table 123 for installing the driving unit 160 in the second end portion 122. As an example, the second end 122 may be provided with a guide rail 124 for guiding a movement of the loading member 140, as shown in more detail in FIG. 3. A detailed description thereof will be provided later. In addition, the body frame 120 may be provided with an installation device 125 for installing the body frame 120 in an upper end portion thereof.

Meanwhile, in the present example embodiment, a case in which the body frame 120 includes a first end portion 121 and a second end portion 122 is described as an example, but the present inventive concept is not limited thereto, the number of end portions may be variously changed. That is, the body frame 120 may have a multi-stage structure of three or more end portions.

A plurality of loading members 140 are installed on the body frame 120. As an example, the plurality of loading members 140 may include a plurality of first loading members 142 installed on a lower end portion of the body frame 120, for example, on a first end portion 121, and a plurality of second loading members 144 disposed above the first loading members 142, and movably installed on the body frame 120, for example, a second end portion 122.

Meanwhile, the first loading member 142 is fixedly installed to the first end portion 121 of the body frame 120. As an example, the four first loading members 142 may be installed in the first end portion 121. However, the present inventive concept is not limited thereto and the number of the first loading members 142 may be variously changed.

When the carrying material is loaded on the first loading member 142, a locking protrusion 142a for preventing separation of the carrying material 10 may be provided. The locking protrusion 142a may be formed to protrude upwardly from front and rear ends of the first loading member 142.

The second loading member 142 is movably installed in the second end portion 122 of the body frame 120. As an example, the number of the second loading members 144 may be one less than the number of the first loading members 142 in the second end portion 122. That is, the second loading member 144 is not disposed above one first loading member 142 among the plurality of first loading members 142 so as to be able to load and transport the carrying material 10 to the first loading member 142. Meanwhile, in the present example embodiment, a case in which the three second loading members 144 are installed in the second end portion 122 is described as an example, but the number of the second loading member 144 may be variously changed.

Meanwhile, the second loading member 144 may also be provided with a locking protrusion 144a for preventing separation of the carrying material 10.

Figure 3:
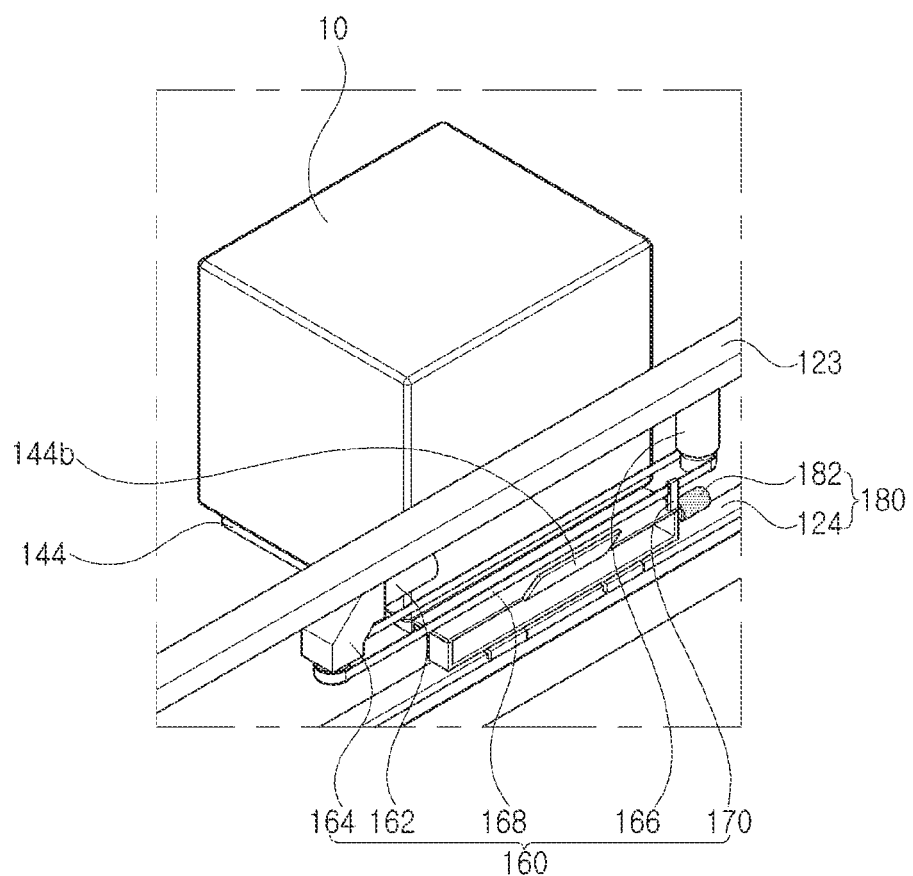
FIG. 3 is an explanatory view illustrating a driving unit of the apparatus for storage of a carrying material according to an example embodiment.

As shown in more detail in FIG. 3, the second loading member 144 may include a fastener 144b coupled to a guide rail 124 of the second end portion 122. That is, the fastener 144b is coupled to the guide rail 124 so that the second loading member 144 is slidably moved. However, the configuration for sliding movement of the second loading member 144 is not limited to the guide rail 124 and the fastener 144b, and may be implemented by other configurations.

The driving unit 160 is connected to at least one of the plurality of loading members 140. As an example, the driving unit 160 may be connected to at least one of the second loading members 144. Meanwhile, the driving unit 160 may include, for example, a driving source 162, a reduction gear 164, a pulley 166, a timing belt 168, and a connection member 170.

The driving source 162 is fixedly installed on an installation table 123 of the body frame 120. As an example, the driving source 162 may be a motor. In addition, the driving source 162 may perform a forward rotation and a reverse rotation. In addition, the reduction gear 164 is connected to the driving source 162, and power generated from the driving source 162 by the reduction gear 164 may be appropriately adjusted and transmitted to the pulley 166. The pulley 166 may guide a caterpillar motion of the timing belt 168 and the two thereof may form a pair. The driving force generated from the driving source 162 may be transmitted to the timing belt 168 through the pulley 166, and accordingly, the timing belt 168 may perform a caterpillar motion. The connection member 170 serves to connect any one of the timing belt 168 and the second loading member 144. Accordingly, any one of the second loading members 144 may be moved when the timing belt 168 is driven. As such, by the forward and reverse rotation of the driving source 162, the second loading member 144 may be moved to the left or right of the body frame 120 in an X direction (see FIGS. 1 and 2).

Meanwhile, in the present example embodiment, a case in which the driving unit 160 includes a pulley 166 and a timing belt 168 has been described as an example, but the present inventive concept is not limited thereto. The driving unit 160 may be provided with a ball screw or a plurality of gears, and thereby, driving force generated from the driving source 162 may also be transmitted to the loading member 140.

Figure 4:
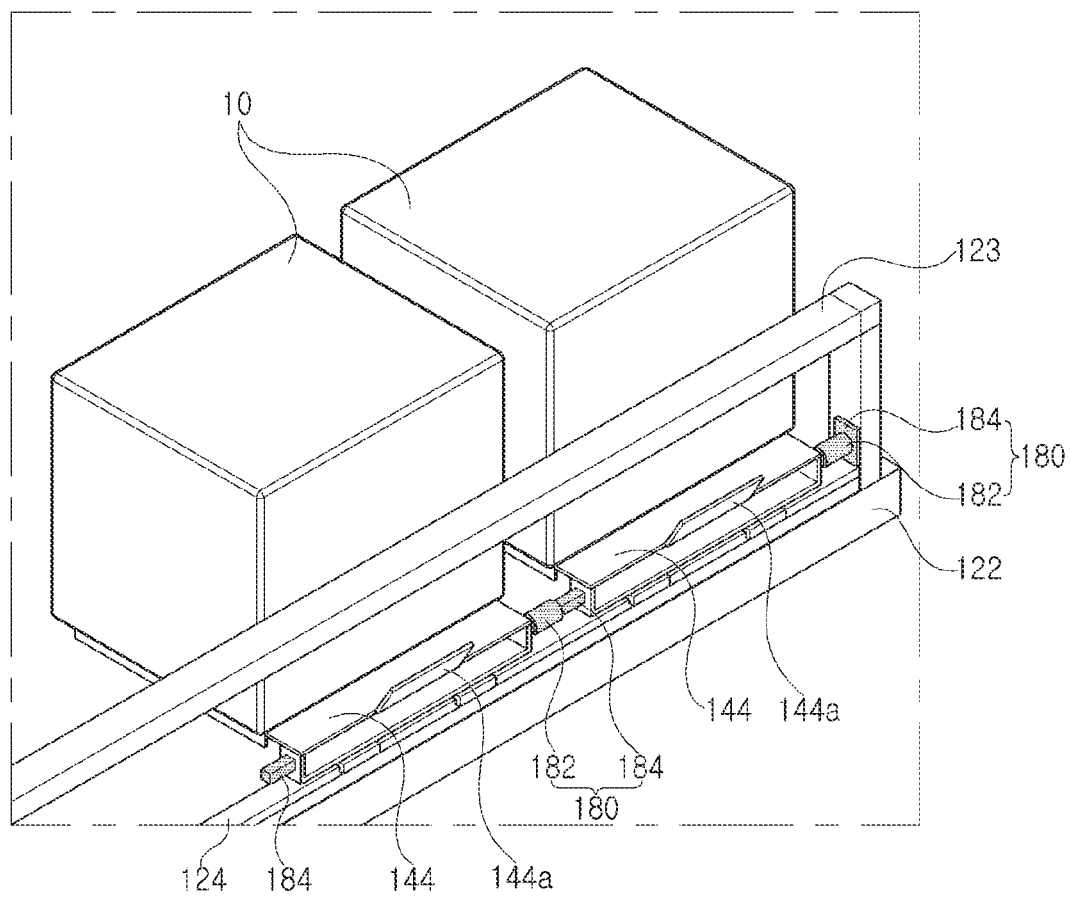
FIG. 4 is an explanatory view illustrating an auxiliary coupling unit of the apparatus for storage of a carrying material according to an example embodiment.

The auxiliary coupling unit 180 is provided in a portion of the plurality of loading members 140 for attachment and detachment to and from an adjacent loading member 140. As an example, the auxiliary coupling unit 180 may be provided on the second loading member 144. As shown in more detail in FIG. 4, for example, the auxiliary coupling unit 180 may include an electromagnet 182 installed at one end of the second loading member 144, and a magnetic body 184 installed at the other end of the second loading member 144 and the body frame 120 to correspond to the electromagnet 182. Looking at this in more detail, the second loading member 144 connected to the driving unit 160 is provided with an electromagnet 182, and the second loading member 144 disposed adjacent to the second loading member 144 to which the driving unit 160 is connected is provided with a magnetic body 184 corresponding to the electromagnet 182. An electromagnet 182 is provided at the other end of the second loading member 144 provided with the magnetic body 184, and a magnetic body 184 is provided with one end of the second loading member 144 disposed adjacent to correspond to the electromagnet 182. An electromagnet 182 is provided at the other end of the second loading member 144, and a magnetic body 184 is provided in the body frame 120 to correspond thereto. As described above, the number of movement of the second loading member 144 through the auxiliary coupling unit 180 composed of the electromagnet 182 and the magnetic body 184 may be determined.

Here, for convenience of explanation, the second loading member 144 connected to the driving unit 160 is referred to as a 2-1 loading member, the second loading member 144 disposed adjacent to the 2-1 loading member is referred to as a 2-2 loading member, and the second loading member 144 disposed adjacent to the 2-2 loading member is referred to as a 2-3 loading member.

When the electromagnet 182 provided in the 2-1 loading member is operated, the magnetic body 184 provided in the 2-2 loading member is coupled to the electromagnet 182 provided in the 2-1 loading member. Accordingly, the 2-1 loading member and the 2-2 loading member may be moved together. Conversely, when the electromagnet 182 provided in the 2-1 loading member does not operate, the magnetic material 184 provided in the 2-2 loading member may be separated from the electromagnet 182 provided in the 2-1 loading member. Accordingly, the 2-1 loading member may not be moved together with the 2-2 loading member, and only the 2-1 loading member may be moved by driving of the driving unit 160.

When the electromagnet 182 provided in the 2-2 loading member is operated, the magnetic body 184 provided in the 2-3 loading member is coupled to the electromagnet 182 provided in the 2-2 loading member. Accordingly, the 2-2 loading member and the 2-3 loading member may be moved together. However, when the 2-3 loading member is moved, the electromagnet 182 provided in the 2-3 loading member may not operate.

A detailed description thereof will be provided later.

Meanwhile, in the present example embodiment, a case in which the auxiliary coupling unit 180 is composed of the electromagnet 182 and the magnetic material 184 has been described as an example, but the present disclosure is not limited thereto, and the auxiliary coupling unit 180 may be configured to include a cam, a solenoid, or the like.

As described above, some or all of the plurality of second loading members 144 can be moved through the driving unit 160 and the auxiliary coupling unit 180, so that the carrying material 10 may be loaded on the body frame 120 to form a plurality of layers. Furthermore, while the carrying material 10 is loaded on the loading member 140 to form a plurality of layers, transport and loading of the carrying material 10 may be easily performed. In other words, the transport and loading of the carrying material 10 may be performed through an existing overhead hoist transport (OHT) without changing a structure or component parts of the overhead hoist transport (OHT, not shown) provided in the semiconductor manufacturing line.

Hereinafter, with reference to the drawings, an operation of an apparatus for storage of a carrying material will be described.

Figure 5:
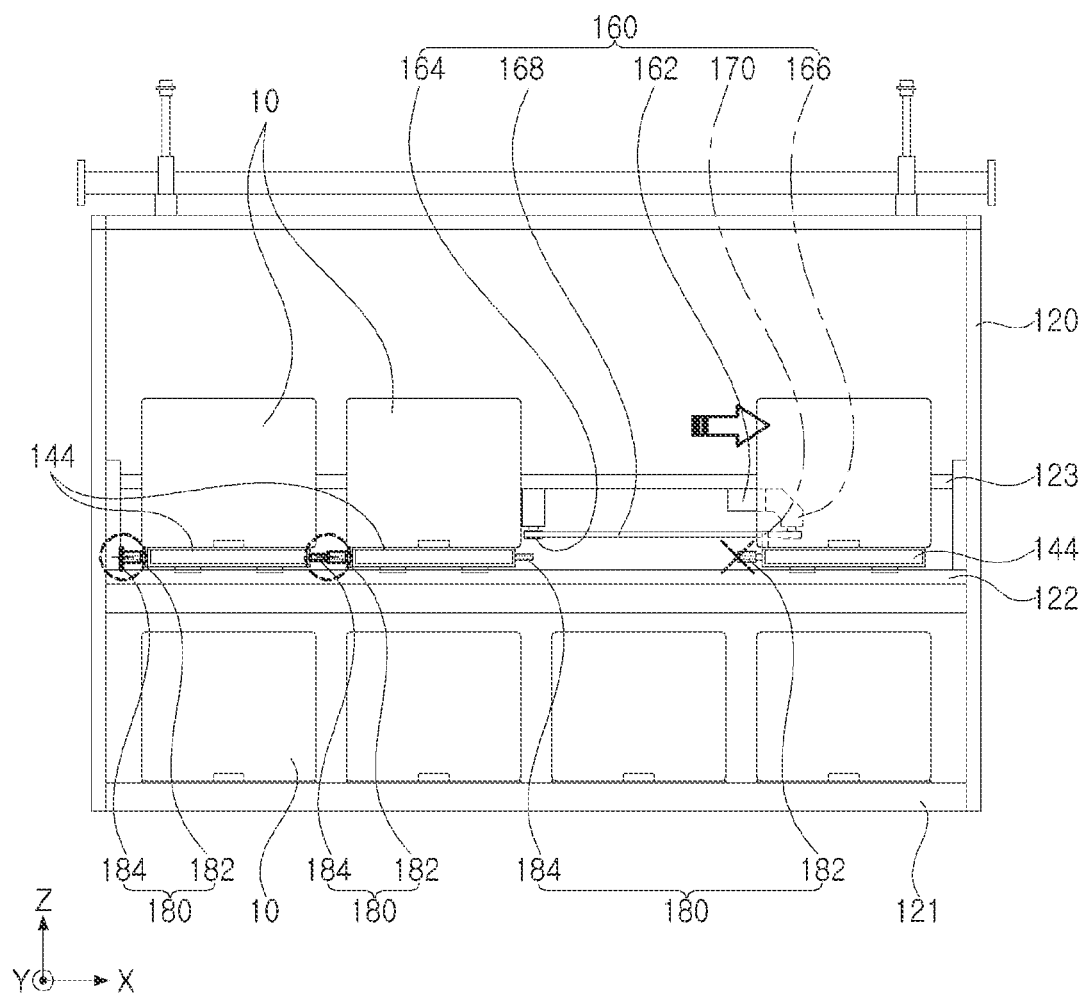
FIGS. 5 to 7 are explanatory views illustrating an operation of the apparatus for storage of a carrying material according to an example embodiment.
Figure 6:
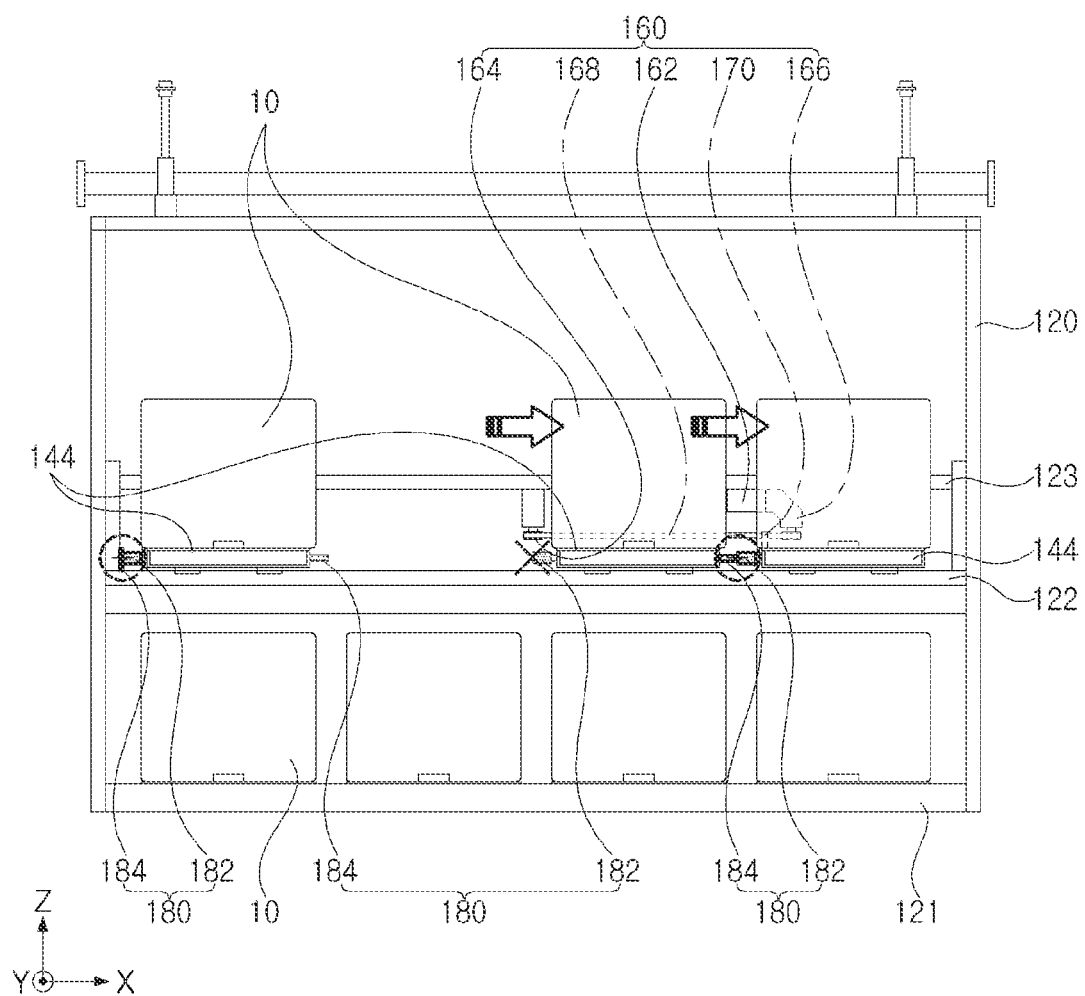
Figure 7:
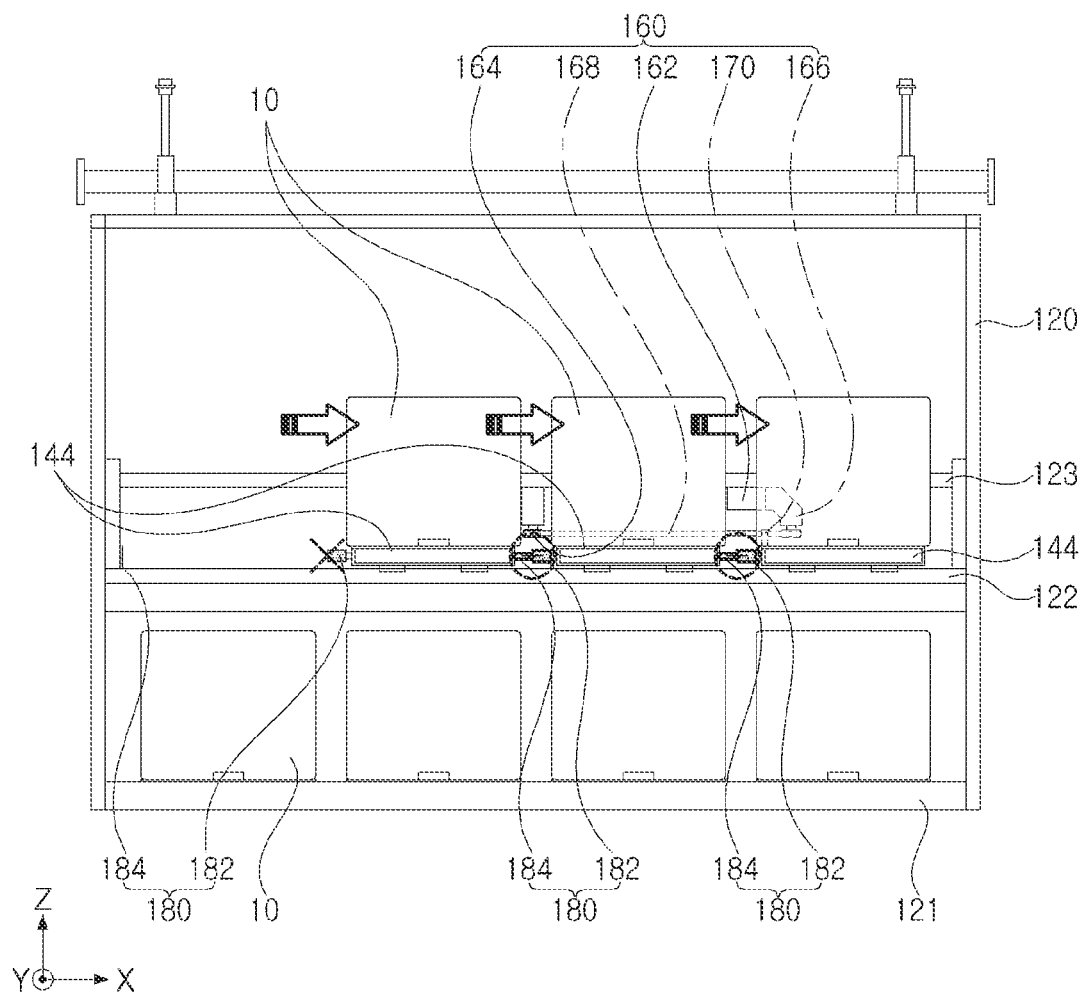

FIGS. 5 to 7 are explanatory views illustrating an operation of an apparatus for storage of a carrying material according to an example embodiment.

Referring to FIG. 5, when an apparatus for storage of a carrying material 10 disposed third from the left among apparatuses for storage of a carrying material loaded on a first end portion 121 of a body frame 120 is desired to be transported, only a second loading member 144 to which a driving unit 160 is connected is moved to the right in an X-axis direction. In this case, an electromagnet 182 provided in the second loading member 144 to which the driving unit 160 is connected does not operate, and an electromagnet 182 provided in a remaining second loading member 144 operates. Accordingly, since the remaining second loading member 144 may not be moved, the apparatus for storage of a carrying material 10 disposed third from the left among the apparatuses for storage of a carrying material 10 loaded on the first end portion 121 of the body frame 120 can be transported.

Referring to FIG. 6, when it is desired to transport a carrying material 10 disposed second from the left among the carrying materials 10 loaded in the first end portion 121 of the body frame 120, a second loading member 144 adjacent to the second loading member 144 to which the driving unit 160 is connected moves to the right in an X-axis direction. In this case, an electromagnet 182 provided in the loading member 144 to which the driving unit 160 is connected operates, and an electromagnet 182 provided in the loading member 144 disposed adjacent to the loading member 144 to which the driving unit 160 is connected does not operate. An electromagnet 182 provided in the other loading member 144 operates and is coupled to a magnetic body 184 installed in the body frame 120. Accordingly, it is possible to transport the carrying material 10 disposed second from the left among the carrying materials 10 loaded on the first end portion 121 of the body frame 120.

In addition, referring to FIG. 7, when it is desired to transport a carrying material 10 disposed first from the left among the carrying materials 10 loaded in the first end portion 121 of the body frame 120, all second loading members 144 are moved to the right in an X-axis direction. In this case, only the electromagnet 182 corresponding to the magnetic material 184 installed in the body frame 120 is not operated, and all the other electromagnets 182 are operated. Accordingly, the carrying material 10 disposed first from the left among the carrying materials 10 loaded in the first end portion 121 of the body frame 120 may be transported.

As set forth above, an apparatus for storage of a carrying material that facilitates transport and loading of a carrying material while increasing a loading space of carrying material may be provided.

Herein, a lower side, a lower portion, a lower surface, and the like, are used to refer to a direction toward a mounting surface of the fan-out semiconductor package in relation to cross sections of the drawings, while an upper side, an upper portion, an upper surface, and the like, are used to refer to an opposite direction to the direction. However, these directions are defined for convenience of explanation, and the claims are not particularly limited by the directions defined as described above.

The meaning of a "connection" of a component to another component in the description includes an indirect connection through an adhesive layer as well as a direct connection between two components. In addition, "electrically connected" conceptually includes a physical connection and a physical disconnection. It can be understood that when an element is referred to with terms such as "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

The term "an example embodiment" used herein does not refer to the same example embodiment, and is provided to emphasize a particular feature or characteristic different from that of another example embodiment. However, example embodiments provided herein are considered to be able to be implemented by being combined in whole or in part one with one another. For example, one element described in a particular example embodiment, even if it is not described in another example embodiment, may be understood as a description related to another example embodiment, unless an opposite or contradictory description is provided therein.

Terms used herein are used only in order to describe an example embodiment rather than limiting the present disclosure. In this case, singular forms include plural forms unless interpreted otherwise in context.

While example embodiments have been shown and described above, it will be apparent to those skilled in the art that modifications and variations could be made without departing from the scope of the present inventive concept as defined by the appended claims.

What is claimed is:

1. An apparatus for storage of a carrying material, comprising:
   a body frame;
   a plurality of loading members installed on the body frame and disposed such that a carrying material forms a plurality of layers in upper and lower directions;
   a driving unit connected to at least one of the plurality of loading members; and
   an auxiliary coupling unit provided in a portion of the plurality of loading members for attachment and detachment to and from a neighboring loading member,
   wherein the plurality of loading members are provided with a plurality of first loading members fixedly installed in a lower end portion of the body frame, and a plurality of second loading members disposed above the first loading members and movably installed on the body frame,
   wherein the driving unit is connected to at least one of the plurality of second loading members,
   wherein the auxiliary coupling unit includes an electromagnet installed at one end of the second loading members, and a magnetic body installed at an other end of the second loading members and the body frame to correspond to the electromagnet.

2. The apparatus for storage of a carrying material of claim 1, wherein the driving unit comprises a driving source fixedly installed on the body frame, a power transmission member connected to the driving source to transmit power, and a connection member connecting the power transmission member and a second loading member from among the plurality of second loading members, wherein the power transmission member includes a pulley, and a timing belt connected to the pulley.

3. The apparatus for storage of a carrying material of claim 2, wherein the driving unit further comprises a reduction gear connecting the pulley and the driving source.

4. The apparatus for storage of a carrying material of claim 1, wherein the body frame is provided with a guide rail along which the plurality of second loading members are moved.

5. The apparatus for storage of a carrying material of claim 1, wherein the plurality of loading members are provided with a locking protrusion for preventing separation of the carrying material.

6. The apparatus for storage of a carrying material of claim 1, wherein the plurality of loading members are disposed to form two layers.

7. The apparatus for storage of a carrying material of claim 6, wherein a number of the first loading members is one more than a number of the second loading members.

8. The apparatus for storage of a carrying material of claim 1, wherein a number of the plurality of second loading members that are moved when the driving unit is driven is selectable based on operation of the electromagnet in the auxiliary coupling unit in the plurality of second loading members.

\* \* \* \* \*